Aug. 15, 1950  L. DUDLEY  2,519,236
FISHING LURE
Filed June 15, 1948
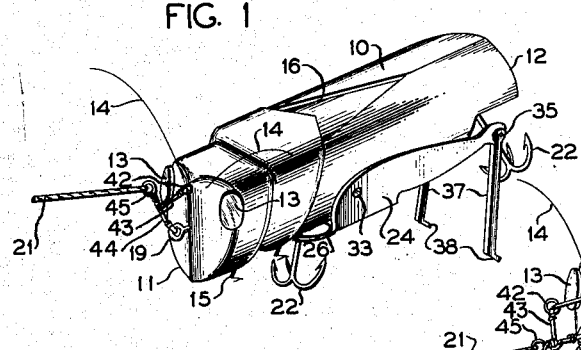
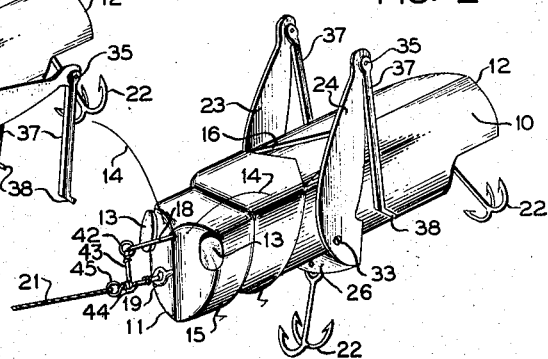
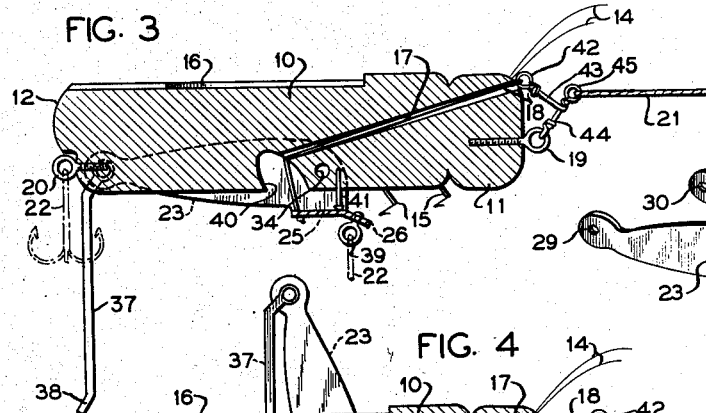
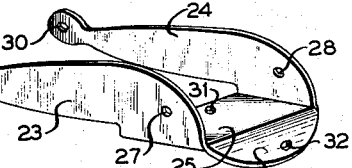
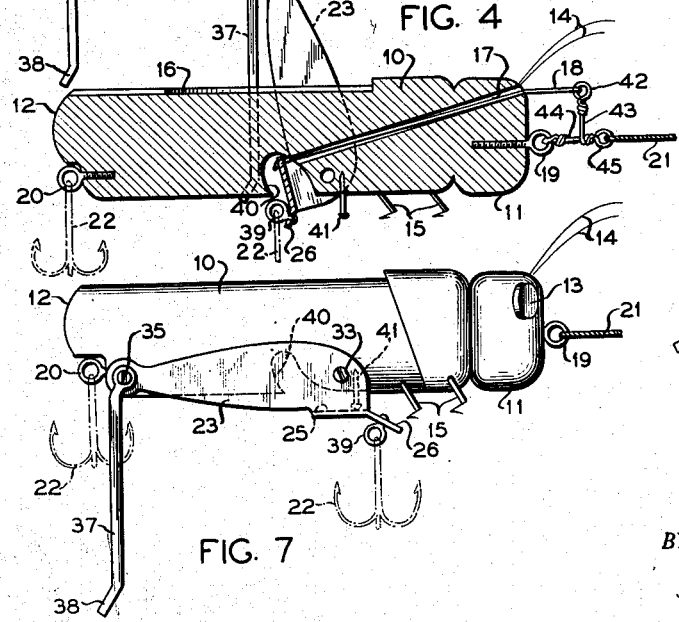
*INVENTOR.*
LYMAN DUDLEY
BY
*A. Yates Dowell*
ATTORNEY Patented Aug. 15, 1950

2,519,236

UNITED STATES PATENT OFFICE 2,519,236

FISHING LURE

Lyman Dudley, Tucumcari, N. Mex.

Application June 15, 1948, Serial No. 33,089

4 Claims. (Cl. 43—42.02)

This invention relates to sporting and sports equipment, and more particularly to that used by fishermen, and specifically a lure used in fishing.

Innumerable efforts have been made to produce a lure which will attract fish to a greater degree than previous devices in order to improve the sportsmanship and results in fishing.

It is an object of the present invention to provide an improved lure which will attract and facilitate the movement of fish into sufficient proximity to hooks to permit the fish to be snared which will appeal also to the fisherman, and satisfy his wishes in the action of the lure, as well as his ideas in the smooth handling of the same.

A further object of the invention is to provide a lure that will simulate in its action that of a grasshopper, with legs that move relative to the body of the lure, the raising or moving of the legs being produced by the pulling of the fishing line, with such action being facilitated by a scoop or water-engaging connection between the legs. In other words, the invention contemplates a lure in which animation may be produced by manipulation of the fishing line.

Further objects and advantages of the invention will be apparent from the following description taken in conjunction with the accompanying drawings, wherein:

Fig. 1 is a perspective illustrating one application of the invention, with the legs lowered;

Fig. 2, a similar view, with the legs raised;

Fig. 3, a longitudinal vertical section, with the legs lowered;

Fig. 4, a similar view, with the legs raised;

Fig. 5, a perspective of the thigh portions of the legs and the transverse connecting web;

Fig. 6, a perspective of the lower portions of the legs, and;

Fig. 7, a side elevation of the lure, with the legs lowered.

With continued reference to the drawings, the fishing lure or plug of the present invention comprises a body 10 having a head 11 and tail 12. The head and body are formed to give the appearance of independence and the former is provided with eyes 13, and an antenna 14. The body is provided with front legs 15 and a cut-out upper or back portion 16, representing wings in overlapping position. The body is likewise provided with a longitudinal bore 17 which extends from the head to the central portion of the body and is adapted to receive an actuating line 18, the purpose of which will be described later.

The lure is provided with screw-eyes 19 and 20 in its head and rear portions, respectively, the screw-eye 19 being adapted to receive the end of a fishing line 21, and the screw-eye 20 being adapted to receive a hook 22, preferably three-pronged.

Plugs for use in fishing are old and well-known, however, the present invention is an improvement over previous types of plugs by the provision among other things of mechanism to add animation thereto by the imitation of the movement of a live insect. In order to accomplish this a pair of legs are provided having thigh portions 23 and 24, formed preferably of relatively thin sheet material, such as metal, with such thigh portions joined by way of a cross member 25 which with such thigh portions forms in effect a yoke. The yoke also includes a scoop or angular portion 26, which for simplicity may be integral with the web 25, but disposed at an angle thereto. This scoop is adapted to be influenced by the water with which it comes in contact when the device is being towed or is being used in fishing.

The yoke is provided with openings 27, 28, 29, 30, 31, and 32; the openings 27 and 28 being pivot openings adapted to receive a pivot 33 located in an opening 34 transversely in the lower portion of the body 10. The mounting thus described permits the yoke to rock or oscillate on the pivot 33. The openings 29 and 30, at the opposite ends of the thigh portions from the openings 27 and 28 are adapted to receive pins 35, which secure the ends of the thigh portions of the legs in the bifurcated ends 36 of the calf portions of the legs 37, such calf portions having angular portions representing feet or feelers 38. The opening 31 is adapted to receive the end of the actuating line 18 and the opening 32 is located in the scoop or angular member 26, and is adapted to receive a screw-eye 39 for the reception of a second hook 22.

For compactness and other advantages of construction the plug is provided on its underside with an opening 40 adapted to house the web portion 25 of the yoke when the thigh portions of the yoke are across or substantially transversely of the body of the lure.

A stop 41, as shown in Figs. 3 and 7, may be employed for limiting the movement of the yoke from a position transversely of the body of the lure to a position substantially parallel to such body. The operating cord 18 in addition to being attached to the web 25 of the yoke in the opening 31 extends to an eye 42 supported by a bracket 43 from a longitudinal wire 44 on the outer end of which is disposed a ring or eye 45 for attachment of the fishing line 21.

When the lure is on the end of a fishing line 21 and the line is pulled suddenly or abruptly, force will be exerted through the bracket 43 to the ring 42 and the operating cord 18. Force transmitted through the cord 18 will be imparted to the web 25, causing the thigh portions of the legs to be pulled toward a raised position transversely of the body of the lure. This action will be assisted by the angular portion or scoop catching the water as the web portion enters the notch in the lure, and due to the angle of the scoop the lure will be caused to remain on the surface of the water when it is jerked instead of jumping out of the water. The attachment of the hook in the opening 32 of the scoop provides better equalization of weight or balance, and consequently enhances the ease and smoothness with which the device may be operated or manipulated in the water.

Due to the relation of the flat surfaces of the scoop, web and thigh portions of the yoke, improved guiding action is obtained, preventing the lure from slipping sideways or from having an unnatural wiggling action.

It will thus be readily apparent that in order to make the plug more life-like in its action, in order to cause certain species of fish to bite during certain seasons of the year, the thigh and calf portions of the legs are caused to move in a manner similar to those of a grasshopper, with the calf portions normally folded rearwardly upon the thigh portions when the legs are in raised position.

In Fig. 7, a slightly modified type of construction is illustrated, there being no longitudinal bore with an operating cord therethrough for connecting the operating web of the legs to the fishing line as in the preceding figures.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A fishing lure comprising a body having a head portion, and a yoke pivoted upon and swingable relative to said body with the sides of said yoke simulating legs on opposite sides of said body, the intermediate portion of said yoke having a flat forwardly inclined portion extending into the water and forming a scoop whereby movement of the lure in the water will produce movement of said simulated legs and give animation to said lure.

2. A fishing lure comprising a body having a head portion, and a yoke pivoted upon and swingable relative to said body with the sides of said yoke simulating legs on opposite sides of said body, the intermediate portion of said yoke having a flat forwardly inclined portion extending into the water and forming a scoop whereby movement of the lure in the water will produce movement of said simulated legs and give animation to said lure, a bore extending through said body from said head portion to a point adjacent said intermediate portion of said yoke, a connecting member on said head portion, a bracket having three projections, one of said projections being attached to said connecting member, a second of said projections being operatively connected through said bore to said intermediate portion of said yoke and the third projection being adapted to be connected to a fishing line.

3. A fishing lure comprising a body having a head portion, and a yoke pivoted upon and swingable relative to said body with the sides of said yoke simulating legs on opposite sides of said body, a bore extending through said body from said head portion to a point adjacent said intermediate portion of said yoke, a connecting member on said head portion, a bracket having three projections, one of said projections being attached to said connecting member, a second of said projections being operatively connected through said bore to said intermediate portion of said yoke, and the third projection being adapted to be connected to a fishing line.

4. A fishing lure comprising a body having a head portion, and a yoke pivoted upon and swingable relative to said body with the sides of said yoke, simulating legs on opposite sides of said body, a line connected to said head portion, and means connecting said line and said intermediate portion of said yoke for producing movement of said simulated legs.

LYMAN DUDLEY.

REFERENCES CITED

The following references are of record in the file of this patent:

UNITED STATES PATENTS

| Number | Name | Date |
| --- | --- | --- |
| 1,813,722 | Wright et al. | July 7, 1931 |
| 1,849,434 | Page | Mar. 15, 1932 |
| 2,234,077 | Hayley, Jr. | Mar. 4, 1941 |
| 2,235,331 | Pugh | Mar. 18, 1941 |
| 2,430,111 | Dory | Nov. 4, 1947 |